United States Patent
Kawai et al.

(10) Patent No.: US 8,124,045 B2
(45) Date of Patent: Feb. 28, 2012

(54) METHOD OF SELECTIVE PURIFICATION OF ARMCHAIR CARBON

(75) Inventors: Takazumi Kawai, Tokyo (JP); Yoshiyuki Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 416 days.

(21) Appl. No.: 12/309,190

(22) PCT Filed: Jun. 21, 2007

(86) PCT No.: PCT/JP2007/062496
§ 371 (c)(1),
(2), (4) Date: Jan. 9, 2009

(87) PCT Pub. No.: WO2008/010383
PCT Pub. Date: Jan. 24, 2008

(65) Prior Publication Data
US 2009/0257943 A1 Oct. 15, 2009

(30) Foreign Application Priority Data
Jul. 18, 2006 (JP) .................................. 2006-196106

(51) Int. Cl.
*D01F 9/12* (2006.01)
(52) U.S. Cl. ...................... 423/447.6; 423/461; 977/845
(58) Field of Classification Search ............... 423/447.6, 423/461; 977/845
See application file for complete search history.

(56) References Cited

U.S. PATENT DOCUMENTS
7,090,819 B2 * 8/2006 Smalley et al. ............ 423/447.6
2006/0013758 A1 1/2006 Iijima et al.
2007/0004231 A1 1/2007 Maehashi et al.

FOREIGN PATENT DOCUMENTS
| JP | 8-231210 | 9/1996 |
| JP | 2004-26595 | 1/2004 |
| JP | 2004-210608 | 7/2004 |
| JP | 2004-284852 | 10/2004 |
| JP | 2005-074557 | 3/2005 |
| JP | 2006-027945 | 2/2006 |

OTHER PUBLICATIONS

Holzinger et al., 'A New Purification Method For Single-Wall Carbon Nanotubes (SWNTs)' in Appl. Phys. A vol. 70 pp. 599-602 2000 (no month).*

Takazumi Kawai, et al., Theoretical Calculations for Mono-Vacancy Diffusion on Carbon Nanotubes, Abstracts The 31th Fullerene-Nanotubes General Symposium, Jul. 12, 2006, p. 14.

* cited by examiner

*Primary Examiner* — Stuart Hendrickson
(74) *Attorney, Agent, or Firm* — McGinn IP Law Group, PLLC

(57) ABSTRACT

The present invention provides a method of selectively extracting metallic armchair carbon nanotubes alone from the mixture of carbon nanotubes of mixed chiralities, wherein vacant lattice defects are removed from armchair carbon nanotubes alone using the fact that the vacant lattice defects of zigzag carbon nanotubes are hard to diffuse in the axial direction of nanotubes compared with those of armchair carbon nanotubes. Since vacant lattice defects remaining on zigzag carbon nanotubes are active, the tube structures are easily destroyed and decomposed by oxidation etc. Thus it is possible to extract armchair carbon nanotubes alone from the mixture of carbon nanotubes of mixed chiralities.

8 Claims, 2 Drawing Sheets

METHOD OF SELECTIVE PURIFICATION OF ARMCHAIR CARBON

TECHNICAL FIELD

This application claims the priority to Japanese Patent Application No. 2006-196106 filed on Jul. 18, 2006, the entire disclosure of which is incorporated herein by reference.

The present invention relates to a method of selectively extracting metallic armchair carbon nanotubes alone from a mixture of carbon nanotubes with mixed chiralities.

BACKGROUND ART

In the application of single-wall carbon nanotubes to nanodevices, to obtain device characteristics and stability, it is a very important subject to sort out nanotubes different in their electrical properties. Armchair carbon nanotubes all have metallic properties, and they are promising wiring materials for nanodevices.

For methods of selectively extracting metallic carbon nanotubes alone, Patent Document 1 discloses a technique where carbon nanotubes are irradiated with light of a single wavelength to excite carbon nanotubes in the specific electronic state, and the excited carbon nanotubes are burned away by oxidation with oxygen or any other oxidant.

Patent Document 2 discloses a technique where carbon nanotubes having non-uniform band gaps are irradiated with laser light in an atmosphere of oxygen to excite specific carbon nanotubes, and the excited carbon nanotubes are removed by oxidation.

Patent Document 3 discloses a technique where specific low-dimensional quantum structures are irradiated with electromagnetic waves and low-dimensional quantum structures having a density of states that resonate with the electromagnetic wave are selectively removed by oxidation. Further, Patent Document 4 discloses a method in which alternating voltage is applied to a carbon-fiber suspension to allow conductive fiber alone to adhere to the insulating film on electrodes.

Patent Document 1: Japanese Patent Laid-Open No. 2004-210608
Patent Document 2: Japanese Patent Laid-Open No. 2004-284852
Patent Document 3: Japanese Patent Laid-Open No. 2005-074557
Patent Document 4: Japanese Patent Laid-Open No. 2004-026595

DISCLOSURE OF THE INVENTION

Problems to be Solved by the Invention

However the methods of sorting carbon nanotubes disclosed in Patent Documents 1, 2, 3 and 4 all have some problems. In the methods of Patent Documents 1 and 4, it is necessary to disperse carbon nanotubes in an organic solvent etc.; therefore carbon nanotubes need to be cut short or chemically modified with other water-soluble molecules. As a result, they cannot retain their original structure. In the methods of Patent Documents 2 and 3 which utilize the reaction process of oxygen molecules in gas phase, the reaction requires high temperatures due to large activation barriers; thus, it is hard to control temperatures precisely and sort carbon nanotubes with high accuracy.

Furthermore, by any one of the methods described in these Patent Documents, it is impossible to selectively extract metallic carbon nanotubes after fabricating devices.

Means for Solving the Problems

In the present invention, the fact is utilized that in armchair carbon nanotubes a diffusion of vacant lattices is not anisotropic, but in zigzag carbon nanotubes a diffusion of vacant lattices is anisotropic and hard to occur in the axial direction of the nanotubes. Specifically, in armchair carbon nanotubes, vacant lattices diffuse and reach the ends of the nanotubes; therefore they can be removed. In zigzag carbon nanotubes, however, vacant lattices hardly diffuse in the axial direction of the nanotubes; therefore, they cannot be removed. Since vacant lattices are highly reactive, they are easily destroyed by oxidation etc. Thus, it is possible to selectively destroy zigzag carbon nanotubes, thereby obtaining armchair carbon nanotubes alone.

Specifically, the present invention relates to a purification method of selectively extracting armchair carbon nanotubes from the mixture of carbon nanotubes with mixed chiralities, including: removing vacant lattices existing in the mixture from the beginning or vacant lattices introduced into the mixture afterwards from the armchair carbon nanotubes alone by heating the mixture in vacuum to a specified temperature; and thereafter selectively destroying the carbon nanotubes with vacant lattices.

Effects of the Invention

According to the present invention, semiconductive carbon nanotubes can be selectively removed from the mixture of carbon nanotubes with mixed chiralities, whereby the contact resistance which appears when carbon nanotubes are used as a material for lead wires can be decreased. Further, repeating the steps of the present method with the growing process of carbon nanotubes can provide armchair carbon nanotubes with a higher purity. The method of the present invention can deal with carbon nanotubes having been formed into devices and moreover is applicable as a method of dealing with a large amount of nanotubes in bulk.

DESCRIPTION OF SYMBOLS

Figure 1:
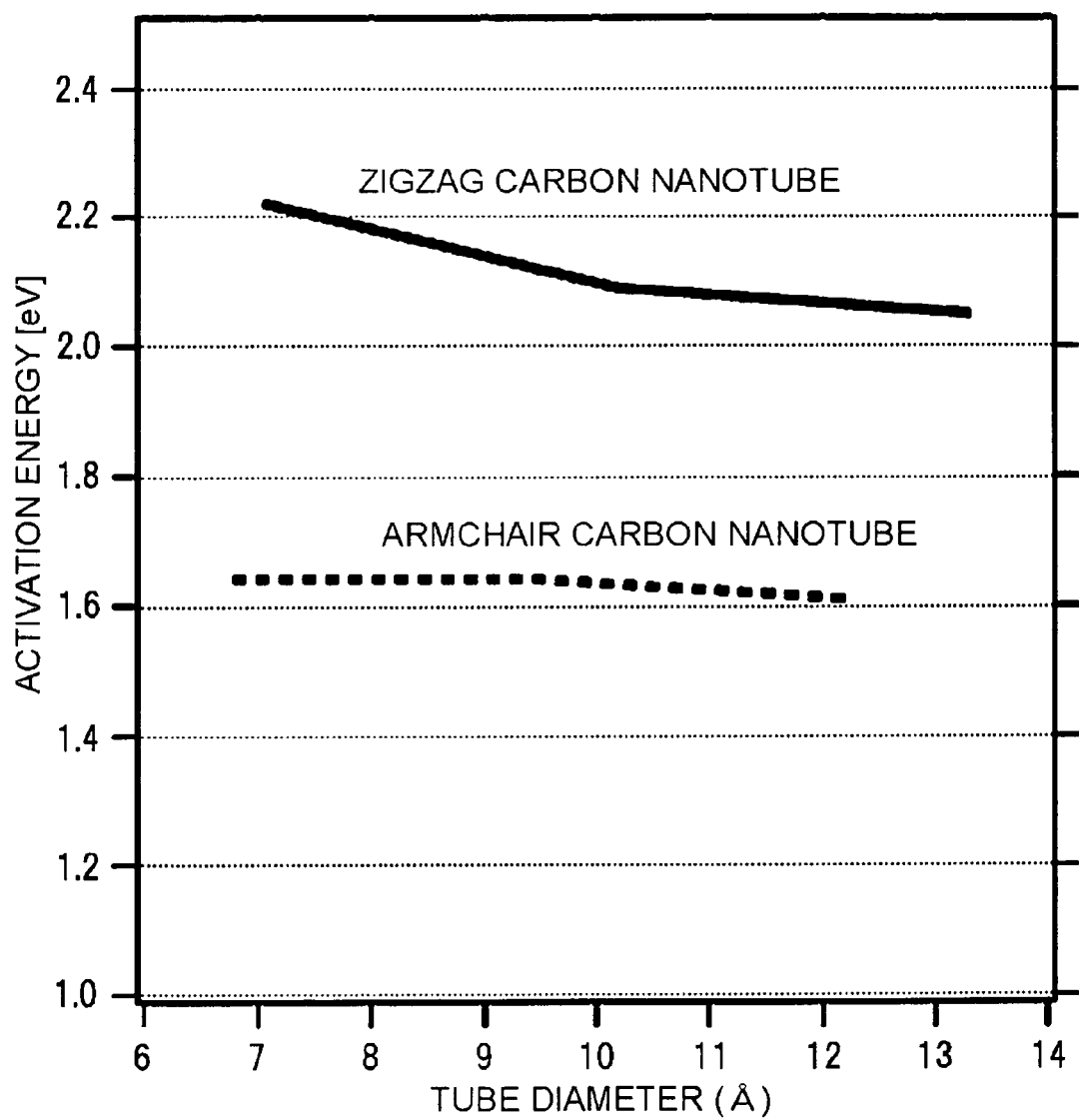
FIG. 1 is a graph showing the tube-diameter dependency of activation energy for vacant lattice diffusion in armchair carbon nanotubes (dotted line) and zigzag carbon nanotubes (solid line)

1 Vacuum chamber
2 Inert gas inlet
3 Oxygen gas inlet
4 Electron beam irradiation device
5 Mixture of carbon nanotubes
6 Exhaust outlet
7 Support base

BEST MODE FOR CARRYING OUT THE INVENTION

In the following the present invention will be described in detail.

Carbon nanotubes which are dealt with by the present invention are produced by known methods such as catalytic decomposition of hydrocarbons, arc discharging or laser ablation. Carbon nanotubes produced by any one of such known methods are a mixture of carbon nanotubes with mixed chiralities, and carbon nanotubes with a chiral angle $\eta=0$ are referred to as zigzag carbon nanotubes and those with a chiral angle $\eta=\pi/6$ are referred to as armchair carbon nanotubes. These nanotubes often contain vacant lattices.

The present invention uses the difference in vacant lattice diffusion to selectively obtain intended armchair carbon nanotubes, as described above. The present invention may employ a method of artificially introducing vacant lattices into carbon nanotubes in addition to vacant lattices which have already been introduced in their production stage. For example, in nanotubes grown by CVD, vacant lattices are formed by encapsulating the nanotubes within a vacuum chamber, keeping the internal vacuum about 1.33 mPa ($10^{-5}$ Torr), and irradiating the nanotubes with electron beams. Artificial introduction of vacant lattices is effective particularly when increasing the purity of armchair carbon nanotubes by repeating the steps of the method of the present invention. In such artificial introduction of vacant lattices, electron beams accelerated at an accelerating voltage of 120 keV or more can be used. Usually the accelerating voltage can be in the range of 120 keV to 200 keV.

The existence of vacant lattices can be ascertained by the vacant lattice defect-related peak appearing at around 1350 $cm^{-1}$ in Raman spectroscopy.

As described above, the difference in diffusion of vacant lattices due to the chiralities of carbon nanotubes, where the vacant lattices are introduced in the stage of carbon nanotube production or artificially introduced after carbon nanotube production, is used to selectively remove the vacant lattices of armchair carbon nanotubes. The diffusion and removal of the vacant lattices is performed by heat treating the mixture of carbon nanotubes at a specified temperature in a non-oxidizing atmosphere. Preferably the heating temperature is 500° C. or higher. If the temperature is lower than 500° C., vacant lattices cannot be sometimes removed from armchair carbon nanotubes, and the armchair carbon nanotubes with vacant lattices remaining therein might be destroyed in the subsequent step. The maximum temperature is desirably 2000° C. or lower. If the mixture of carbon nanotubes is heated at temperatures higher than 2000° C., vacant lattices other than those of armchair carbon nanotubes can be sometimes removed. More preferably, the heating temperature is in the range of 500° C. to 1000° C. When performing the heat treatment, an oxidizing atmosphere needs to be thoroughly excluded so that armchair carbon nanotubes are not destroyed before vacant lattices are removed from them. In the present invention, heating is started while keeping the mixture of carbon nanotubes in a non-oxidizing atmosphere, such as in vacuum or in an inert gas atmosphere. After the heating temperature reaches a specified temperature, vacant lattice diffusion is induced while keeping the temperature for predetermined period of time. The duration of heating is not necessarily limited by the heating temperature, the amount of vacant lattices introduced, the size of carbon nanotubes or the amount of carbon nanotube. However the duration is generally 30 minutes or longer. There is no limit to the maximum heat treating duration; however, the longer the treating duration becomes, the lower the treating efficiency becomes. This means increase in energy cost. Thus, generally four hours or shorter is enough.

Theoretical calculations show that for armchair carbon nanotubes having a diameter of about 1 nm, the activation energy for vacant lattice diffusion is about 1.6 eV in both the axial direction and the circumferential direction. This indicates that the vacant lattice diffusion is not anisotropic. Thus, vacant lattices diffuse freely until they reach the ends of nanotubes and are removed when they reach the ends of nanotubes. For zigzag carbon nanotubes, however, the activation energy for vacant lattice diffusion is about 1.6 eV in the circumferential direction, like that of armchair carbon nanotubes, and 2 eV or more in the axial direction. And in the above described temperature range, vacant lattices can not practically diffuse in the axial direction and thus remain on the nanotubes. The tube-diameter dependency of activation energy for vacant lattice diffusion in armchair carbon nanotubes (dotted line) and zigzag carbon nanotubes (solid line) is shown in the graph of FIG. 1.

After removing vacant lattices from armchair carbon nanotubes alone in the above described manner, zigzag carbon nanotubes with highly reactive vacant lattices are selectively destroyed by oxidation in an oxidizing atmosphere, for example, by introducing oxygen and heating the mixture of carbon nanotubes again. Thus, only vacant lattice-free armchair carbon nanotubes can be obtained. The amount of oxygen introduced in this operation can be such that it enables the oxidation of carbon nanotubes with vacant lattices. Either pure oxygen gas or mixed gas containing oxygen gas, such as air, can be introduced. Preferably the maximum temperature of heating is set at 400° C. or lower. And to allow oxidation reaction to sufficiently progress, preferably the maximum temperature of heating is set at 100° C. or higher. Doing this allows vacant lattice-free armchair carbon nanotubes to remain and destroys zigzag carbon nanotubes with vacant lattices. Purification of armchair carbon nanotubes can be thus accomplished.

In the present invention, these steps are repeated to further destroy the zigzag carbon nanotubes remaining undestroyed, thereby enhancing the purity of armchair carbon nanotubes.

Figure 2:
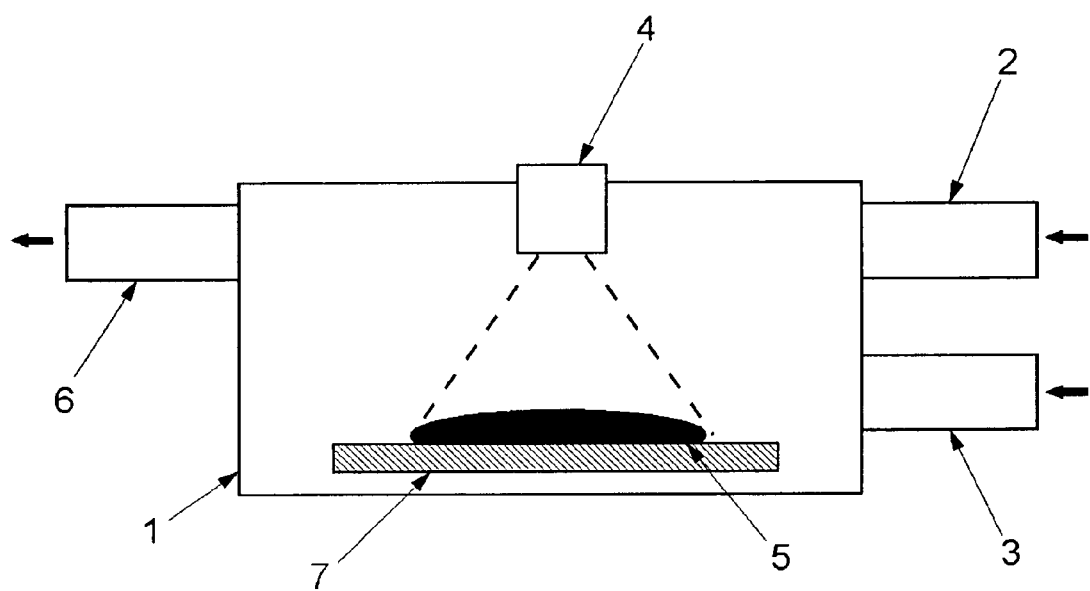
FIG. 2 is an overall view of an exemplary apparatus for selectively purifying armchair carbon nanotubes where the method of the present invention is applied.

These steps can be performed on separate apparatuses respectively or performed continuously on an apparatus as shown in FIG. 2. In FIG. 2, vacuum chamber 1 includes support base 7 with heating means, such as resistance heating, on which mixture of carbon nanotubes 5 is placed. And vacuum chamber 1 is provided with electron beam irradiation device 4 so that mixture of carbon nanotubes 5 can be irradiated with electron beams. Vacuum chamber 1 is further provided with: exhaust outlet 6 connected to a evacuation device for obtaining a specified degree of vacuum; inert gas inlet 2 for making the inside of chamber 1 an inert gas atmosphere in the vacant lattice removing step; and oxygen gas inlet 3 for making the inside of chamber 1 an oxygen gas atmosphere in the destroying step.

In the vacant lattice introduction step, vacuum chamber 1 is evacuated through exhaust outlet 6 to give the inside of chamber 1 a specified degree of vacuum, and mixture of nanotubes 5 is irradiated with electron beams form electron beam irradiation device 4 to introduce vacant lattices into mixture of nanotubes 5. In the vacant lattice removing step, then mixture 5 is heated to a specified temperature while keeping the vacuum degree of the inside of vacuum chamber 1 or after introducing an inert gas such as argon gas into chamber 1 through inert gas inlet 2 to diffuse and remove vacant lattices. Then the temperature of the inside of chamber 1 is lowered little by little, oxygen gas is introduced through oxygen gas inlet 3 to make the oxygen concentration in chamber 1 2%, mixture 5 is again heated to a temperature suitable for oxidation destruction of nanotubes with vacant lattices to oxidize nanotubes other than the armchair carbon nanotubes from which vacant lattices have been removed. These steps may be performed only one time. However, preferably the steps are repeated more than one time to enhance the purity of armchair carbon nanotubes. Particularly for this apparatus, since chamber 1 is once evacuated in the vacant lattice introduction step, an oxidizing atmosphere has been fully removed in the subsequent vacant lattice removing step.

If the apparatus for selectively purifying carbon nanotubes is provided with carbon nanotube producing function, production of carbon nanotubes and purification of the produced carbon nanotubes can be performed continuously. In such a case, raw-material gas introduction means, which is used for synthesizing carbon nanotubes, is added to the apparatus, and thermal CVD is employed to synthesize carbon nanotubes. This is particularly effective in cases where carbon nanotubes are synthesized and purified on a device.

Example

Mixture of carbon nanotubes 5 synthesized by CVD were encapsulated within vacuum chamber 1, the internal vacuum was kept 1.33 mPa ($10^{-5}$ Torr), and mixture of nanotubes 5 was irradiated with 150 keV electron beams from electron beam irradiation device 4 to induce mono-vacant lattices. Then argon gas was introduced into chamber 1 through inert gas inlet 2 and heated to 600° C. to induce vacant lattice diffusion. After lowering the temperature of the inside of vacuum chamber 1 little by little, low-concentration oxygen was introduced, and the inside of vacuum chamber 1 was heated again to 300° C. to oxidize nanotubes other than armchair carbon nanotubes. The nanotubes obtained through the process were observed by Raman spectroscopy, and the observation confirmed that nanotube structures having a diameter of 1 to 2 nm remained. Further, spectra peculiar to semiconductive carbon nanotubes were not observed in excitation and luminescence spectra. This indicates that metallic armchair carbon nanotubes alone remain.

While the present invention has been described by referring to the Example, it is to be understood that the invention is not limited thereto. It will be understood by those skilled in the art that various changes may be made in the arrangement or details of the invention without departing from the scope of the present invention.

INDUSTRIAL APPLICABILITY

Armchair carbon nanotubes purified according to the present invention excel in conductivity and serve as conductive materials or conductivity-imparting materials for various devices.

The invention claimed is:

1. A purification method of selectively extracting armchair carbon nanotubes from carbon nanotubes having mixed chiralities, said method comprising:
heating the carbon nanotubes in a non-oxidizing atmosphere in a range of 500° C. to 2000° C. to remove vacant lattices only from the armchair carbon nanotubes; and
thereafter heating at a temperature of 400° C. or lower in an oxidizing atmosphere to recover armchair carbon nanotubes without said vacant lattices.

2. The purification method according to claim 1, wherein said temperature of said heating at the temperature of 400° C. or lower is at least 100° C.

3. The purification method according to claim 1, wherein after said heating at the temperature of 400° C. or lower, the armchair carbon nanotubes without said vacant lattices remain, and zigzag carbon nanotubes with said vacant lattices are decomposed.

4. The purification method according to claim 1, further comprising introducing said vacant lattices into the mixture by irradiating the carbon nanotubes with electron beams in vacuum.

5. The purification method according to claim 4, further comprising enhancing a purity of the armchair carbon nanotubes by repeating said removing said vacant lattices.

6. The purification method according to claim 1, wherein in said heating at the temperature of 400° C. or lower, the armchair carbon nanotubes without said vacant lattices are not decomposed by oxidation.

7. The purification method according to claim 6, wherein in said heating at the temperature of 400° C. or lower, the carbon nanotubes with said vacant lattices are decomposed by oxidation.

8. The purification method according to claim 1, wherein in said heating at the temperature of 400° C. or lower, the carbon nanotubes with said vacant lattices are decomposed by oxidation.

* * * * *